Patented July 28, 1936

2,048,799

UNITED STATES PATENT OFFICE 2,048,799

SILICON ESTERS OF MODIFIED POLYHYDROXY ALCOHOLS

Walter E. Lawson, Wilmington, Del., assignor to E. I. du Pont de Nemours & Company, Wilmington, Del., a corporation of Delaware No Drawing. Application October 22, 1931, Serial No. 570,494

4 Claims. (Cl. 260—98)

This invention relates to silicon esters of modified polyhydroxy alcohols.

It is known that silicon esters of simple polyhydroxy alcohols, such as ethylene glycol, glycerol, and certain sugars may be prepared by ester interchange from the polyhydroxy alcohol and ethyl silicate in an autoclave. (German Patent 285,285 and its United States equivalent 1,178,-731.) These known esters are described as therapeutically valuable products. To my knowledge, no modified polyhydroxy alcohol in which one or more of the hydroxyl groups has been substituted by an organic radical has hitherto been used in the preparation of the new silicon esters disclosed herein.

This invention has for its object the formation of silicon esters of modified polyhydroxy alcohols. Another object is the preparation of resins in which silicon is chemically combined. A still further object is the preparation of coating compositions containing these silicon resins. A further object resides in a process of manufacturing these products.

I have found that modified polyhydroxy alcohols can be converted into the corresponding silicates by ester interchange with alkyl orthosilicates. The nature of this reaction may be illustrated by the following equation representing the formation of a modified glyceryl silicate from ethyl orthosilicate:

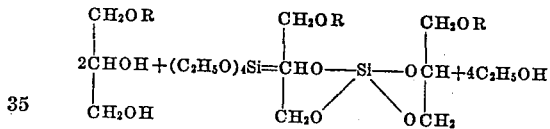

where R represents a modifying group such as an aliphatic or aromatic carboxylic acid radical, or an aliphatic, aromatic, or aliphatic-aromatic hydrocarbon radical. In this specification I use the term "alkyl", as defined in Beilstein—Handbuch der organischen Chemie—4th edition volume 1 page 52 lines 11-9 from the bottom of the page, to include all monovalent hydrocarbon radicals saturated or unsaturated, cyclic or non-cyclic, aromatic, cycloaliphatic or aliphatic. I use the term "alphyl" to denote a non-cyclic saturated or unsaturated hydrocarbon radical, "aryl" to denote an aromatic hydrocarbon radical, "acyl" to denote an acid radical R—CO— where R is an "alkyl" radical, above defined. I use the term "aralphyl" to denote a hydrocarbon radical containing an aryl group but whose free valence is attached to an aliphatic carbon. The above formula for the polyhydric alcohol silicate is the simplest which can be written, and it is quite probable that the ester is one of the long chain polyhydric alcohol-polybasic acid type.

My preferred method of making these new compounds consists in heating equivalent proportions of the modified polyhydric alcohol and tetraalkyl silicate together at a temperature sufficient to cause gentle boiling for a period of six to eight hours. The silicates of any monohydric alcohol such as methyl, ethyl, propyl, butyl or amyl may be used in this ester interchange although I prefer to use tetraethyl silicate because of its availability and the ease of removing ethyl alcohol from the reaction mixture. At the end of this heating period, the product is in solution in the alcohol formed during the ester interchange. It may be stored and used in the form of its solution or the alcohol may be removed by distillation to obtain the solid product.

The physical characteristics of the esters depend upon the number of free hydroxyl groups present in the modified polyhydric alcohol. When but one free hydroxyl group is present, the resulting silicon ester is usually an oil whereas the presence of two or more free hydroxyl groups results in products which are distinctly resinous. Thus, when R in the formula above represents the acid radical of linseed oil acid the resulting monolinseed glyceryl silicate is a resin whereas the substitution of another hydroxyl hydrogen with the same constituent, leaving but one free hydroxyl group in the glyceryl portion of the molecule, yields a non-resinous product, di-linseed glyceryl silicate, which has only the film forming characteristics of the drying oil acid.

The method of preparing these materials is illustrated by the following examples:

Example I

This example outlines the preparation of the silicon ester of the monoethyl ether of glycerol.

Twenty grams of tetraethyl silicate and 23.1 grams of the monoethyl ether of glycerol (monoethylin) were mixed and heated for six to eight hours at a temperature sufficient to cause gentle boiling. The two components were originally miscible and gave rise to a clear light-yellow solution of monoethyl in silicate in alcohol. Flow-outs of this solution on glass plates gave clear, transparent, colorless films which became hard and brittle after two days at room temperature.

Example II

This example describes the preparation of the silicon ester of the monoacetate of glycerol (monoacetin). Twenty-six grams of monoacetin and 20 grams of etra-ethyl-silicate were placed together in a flask. The liquids were originally immiscible but after shaking and heating for 45 minutes a homogeneous solution was obtained. This was further heated for about eight hours, thus giving a solution of monoacetin silicate in ethyl alcohol. Flowouts of this solution gave clear, transparent, colorless films which were somewhat soft. When the solvent was distilled from the solution, the ester remained as a thermoplastic resin.

Example III

This example describes the preparation of the silicon ester of monolinseed glyceride containing 81.6% linseed glyceride. Three hundred and twenty-three grams of linseed oil and 62 grams of glycerol were heated for one hour at 250° C. in the presence of one-half gram of litharge or caustic alkali as a catalyst. 40.7 grams of the resulting monolinseed glyceride were heated for eight hours with 10.8 grams of tetraethyl silicate. The two were only partially miscible at first, but soon formed a clear homogeneous solution of linseed modified glyceryl silicate in alcohol solution. Flowouts of this solution yielded films which exuded on drying.

Example IV

The ratio of linseed glyceride to glyceryl silicate can be varied by the amount of free glycerol added and this example describes the preparation of an ester containing 69% oil.

28.9 grams of previously prepared monolinseed glyceride, 4.6 grams of free glycerol, and 15.6 grams of tetraethyl silicate were heated together for 16 hours. The three components were originally immiscible and two and one-half hours of heating and shaking were required before the mixture became homogeneous. Films of this composition exuded slightly on drying.

Example V

Other oil acids can be used in place of linseed oil. This example describes the preparation of an ester in which cottonseed oil is the modifying agent.

Three hundred and twenty grams of cottonseed oil and 60 grams of glycerol were heated for 45 minutes at 250° C. in the presence of one-half gram of caustic alkali as catalyst. Fifty-five grams of this monocottonseed glyceride and 20 grams of tetraethyl silicate were heated for 16 hours at a temperature sufficient to cause gentle boiling. A clear light yellow solution of cottonseed modified glyceryl silicate in alcohol was obtained. Flowouts of this solution yielded films which dried very slowly to clear, colorless films which were quite soft.

Example VI

Polyhydric alcohol-polybasic acid resins containing excess glycerol can be considered as examples of modified polyhydric alcohols since the excess glycerol is not present as free glycerol, but is in partial combination. It is possible to esterify the free hydroxyl groups by the method of the present invention to form modified glyceryl silicates. This example describes the preparation of such a silicate.

One hundred grams of an oil modified polyhydric alcohol-polybasic acid resin containing excess glycerol were mixed with 92 grams of toluene and eleven grams of ethyl silicate. The polyhydric alcohol-polybasic acid resin consisting of 30.39% phthalic glyceride, 60.77% of cottonseed glyceride and 8.89% excess glycerol was prepared by heating together the following ingredients in the usual manner: phthalic anhydride 22.0%, glycerol 23.45%, cottonseed oil acid 54.55%. The mixture of resin, toluene and ethyl silicate was then heated for twelve hours at the boiling point of the solution. A clear homogeneous solution of the resin silicate was obtained. The composition of the product corresponds to the following empirical percentage.

| | Percent |
|---|---|
| Glyceryl phthalate | 30.00 |
| Glyceryl silicate | 7.79 |
| Cottonseed glyceride | 60.00 |
| Excess glycerol | 2.21 |

Example VII

This example outlines the preparation of the silicon ester of the diethyl ether of glycerol (diethylin silicate).

Sixty grams of the diethyl ether of glycerol (diethylin) and 20 grams of tetraethyl silicate were heated together to a gentle boil for eight to ten hours. The two liquids were originially miscible, and gave rise to a clear, light-yellow solution of diethylin silicate in alcohol. Diethylin silicate is a high boilng, non-drying liquid.

The esters resulting from the esterification of modified polyhydroxy alcohols having but one free hydroxyl group with alkyl silicates are useful as softening agents for the resins prepared from the modified polyhydric alcohols having two or more free hydroxyl groups. Thus, the brittle films prepared from monoethylin as described in Example I are flexibilized by the addition of the diethylin silicate referred to in Example VII.

In addition to softening the resin films by mechanically mixing the oily silicon esters therewith, chemical mixtures of the esters may be prepared. It is possible by either method to prepare films of mixed silicates having any desired degree of hardness and flexibility. The following example describes the preparation of a mixture of diethylin silicate and monoethylin silicate:

Example VIII 19.1 grams of monoethylin, 8.7 grams of diethylin, and 19.6 grams of tetraethyl silicate were mixed together and heated for eight hours at a temperature sufficient to cause gentle boiling. This gave rise to a solution of 30 grams of mixed ethylin silicates in alcohol solution. The solids correspond to 30% diethylin silicate and 70% monoethylin silicate.

I have prepared mixed mono- and diethylin silicates in this manner with the percentage of monoethylin silicate varying from 40% to 70%.

I prefer to make the esters by the method of ester interchange described above since this method in every case has given rise to soluble products. It is satisfactory, however, in some cases to form the ester by treating the modified polyhydric alcohol with silicon tetrachloride in a suitable solvent as indicated in the following example:

Example IX

One hundred and seventy grams of oil modified polyhydric alcohol-polybasic acid resin containing excess glycerol were dissolved in six hundred and seventy grams of xylene. The solution was cooled to 5° C. and thirteen grams of silicon tetrachloride were added. The polyhydric alcohol-polybasic acid resin consisting of 64% phthalic glyceride, 30% linseed glyceride and 6% excess glycerol was prepared by heating together the following ingredients in the proportions indicated:

|  | Per cent |
|---|---|
| Phthalic anhydride | 45.70 |
| Glycerol | 27.69 |
| Linseed oil acid | 26.61 |

The solution of resin and silicon tetrachloride in xylene was then heated gradually to the boiling point and maintained at a temperature of 150–160° C. for six hours. The product then comprises a solution in xylene of an oil modified mixed glyceryl phthalate and glyceryl silicate of the empirical composition:

|  | Per cent |
|---|---|
| Linseed glyceride | 20.6 |
| Glyceryl phthalate | 63.2 |
| Glyceryl silicate | 7.2 |

In place of monoethylin and diethylin, there may be used any ether of glycerol, as for instance benzylin, tolylin, xylylin or methylin, in which at least one hydroxyl group of glycerol is etherified and at least one is left free to react with ethyl silicate. In place of monoacetin, there can be used any derivative of glycerol in which one or two hydroxyl groups are acylated, e. g., with such acids as propionic, butyric, lactic, crotonic, citric, benzoic, phthalic, malic, maleic, fumaric, succinic, adipic, pimelic, stearic, oleic, palmitic, naphthalic, naphthoic, abietic. In place of monolinseed glyceride there can be used derivatives of glycerol in which one or two hydroxyl groups are taken up by drying-oil acids, e. g., those from China wood oil, semi-drying oil acids, e. g., those from castor oil, or non-drying oil acids, e. g., those from cottonseed oil, olive oil, etc. Among other modified polyhydric alcohols that may be used there may be mentioned derivatives of the following alcohols in which derivative at least one hydroxyl group has been modified by ether or acid groups: ethylene glycol, propylene glycol, butylene glycol, diglycerol, polyvinyl alcohol, pentaerythrite, diethylene glycol, triethylene glycol, sorbitol, sugars, and cellulose. Modified polyhydric alcohols such as ethyl cellulose or benzyl sucrose are particularly suitable for the purpose of this invention. I may also use cyclic acetals such as formal glycerol or acetone glycerol. Particularly valuable compounds are obtained from ethers of ethylene glycol and polyethylene glycols for example methyl, ethyl, butyl, etc., ethers of ethylene glycol, methyl and ethyl ethers of diethylene glycol, etc. In the case where the polyhydric alcohol is modified with a hydroxy acid such as lactic, citric, ricinoleic, or mandelic acids, one or more or all hydroxyl groups in the polyhydric alcohol may be thus esterified with the hydroxy acid or a mixture of hydroxy acids or a mixture thereof with non-hydroxylated acids. Thus we may have glycol dilactate, glycol monolactate monostearate, etc. Similarly, castor oil which is chiefly a glyceride of ricinoleic acid in which all of the hydroxyl groups of the polyhydric alcohol, glycerol have been esterified with ricinoleic acid residues, may be converted into the corresponding orthosilicic acid ester according to the following example:

Example IXA

Thirty five grams of castor oil and 5 grams of ethyl silicate were heated at reflux temperature for six hours. This resulted in an 89% solution of castor oil silicate in ethyl alcohol. Castor oil silicate was a viscous, syrupy liquid after the solvent was removed.

When oil modified polyhydric alcohol-polybasic acid resins containing excess polyhydric alcohol are used, they may be made in the usual manner by heating together the polybasic acid, polyhydric alcohol and oil acid, with the exception that in the present instance the polyhydric alcohol is added in such excess as will provide the necessary free hydroxyl groups to react with the alkyl ortho silicate. These resins containing excess polyhydric alcohol can also be made with the drying, non-drying, or semi-drying oils themselves by heating the oils or mixtures thereof and excess polyhydric alcohol preferably in the presence of a catalyst until the two phases merge into a single phase and then heating this glyceride mixture with the polybasic acid until resinification occurs.

In addition to the tetraethyl silicate mentioned in the examples, methyl ortho silicate, or any other alkyl ortho silicate may be used which will liberate a volatile alcohol in the ester interchange. While my silicon esters may be made from phenyl ortho silicate, or from other aryl ortho silicates, the aryl ortho silicates are not satisfactory because the phenol, cresol, or other phenol does not evaporate as readily as desired and their use is otherwise objectionable.

The silicon esters of the type described herein are compatible with various cellulose esters and ethers such as cellulose nitrate or ethyl cellulose and may be used as constituents of cellulose nitrate lacquers. They are also compatible with drying oils and with polyhydric alcohol-polybasic acid resins, as well as with natural resins and may be incorporated in finishes which employ these materials as vehicles. Likewise they may be used in compositions containing benzyl cellulose, cellulose acetate, tars, bitumens, pitches, waxes, asphalts, etc. The linseed modified glyceryl silicate has been used as a paint vehicle in itself, and can be successfully pigmented with pigments that are not basic in character. As examples of their use in cellulose nitrate lacquers, the following may be noted.

Example X

|  | Parts |
|---|---|
| Cellulose nitrate | 10 |
| Silicate of glycerol ethers of Example VIII | 10 |
| Solvent as required | |

The silicate used comprises 80% monoethylin silicate and 20% diethylin silicate. Films prepared from this lacquer are clear, colorless, and transparent.

The following is an example of their use as paint vehicles:

Example XI

|  | Parts |
|---|---|
| Titanium oxide pigment | 177.00 |
| Linseed modified glyceryl silicate comprising 55% linseed oil and 45% glyceryl silicate | 95.73 |
| Drier | 4.27 |
| Thinner as required | |

This composition gives a film with a pigment volume of 28%.

These silicon esters may be made into valuable molding compositions when combined with other ingredients, such as fillers, pigments, etc., usually used in these compositions. The following examples illustrate this application of the invention.

Example XII

| | Grams |
|---|---|
| Monoethylin silicate | 30.0 |
| Fluffed alpha fibre | 30.0 |

Example XIII

| | Grams |
|---|---|
| Monoethylin silicate | 25.0 |
| Wood flour | 24.5 |
| Carbon black | 0.5 |

These compositions, when molded ten minutes at 165° C. and 2000 pounds per square inch, were brittle and friable but can be flexibilized by the incorporation of diethylin silicate. These esters are also valuable as adhesives, for example, in the manufacture of laminated safety glass and for sheets of regenerated cellulose such as "Cellophane" and as impregnating agents for stone, wood, paper, cloth, concrete, etc.

Several advantages result from the properties of my new silicon esters of modified polyhydric alcohols and particularly from the esters produced by the ester interchange method which produces materials which are very slightly colored in comparison with the known polybasic acid-polyhydric alcohol type of compounds. Solutions of my new compounds having a high solids content (50% or more) have low viscosity. Further, when these esters are produced by this method, the solutions are miscible with other organic solvents, such as hydrocarbon and ester solvents. Prior to the present invention silicon esters of polyhydric alcohols in which no free hydroxyl groups were left have been insoluble in organic solvents.

As many apparently widely different embodiments of this invention may be made without departing from the spirit and scope thereof, it is to be understood that I do not limit myself to the specific embodiments thereof except as defined in the following claims:

I claim:

1. A silicon ester of a modified polyhydric alcohol, said modified polyhydric alcohol having at least one free hydroxyl group and having the hydrogen atom of at least one hydroxyl group replaced with an organic radical of the class consisting of alkyl and acyl groups, said ester containing no free hydroxyl groups and being capable of being dissolved in hydrocarbon and ester solvents.

2. The silicon ester set forth in claim 1 in which the organic radical is an acyl group.

3. As a new composition of matter, the reaction product of ethyl orthosilicate with a modified polyhydric alcohol, said modified polyhydric alcohol having at least one free hydroxyl group and having the hydrogen atom of at least one hydroxyl group replaced with an aliphatic hydrocarbon radical, said reaction product containing no free hydroxyl groups and being capable of being dissolved in hydrocarbon and ester solvents.

4. Linseed modified glyceryl silicate comprising the reaction product of an alkyl ortho silicate and modified glycerol having at least one free hydroxyl group and having the hydrogen atom of at least one hydroxyl group replaced by the acid radical of linseed oil glyceride.

WALTER E. LAWSON.